Figure 1:
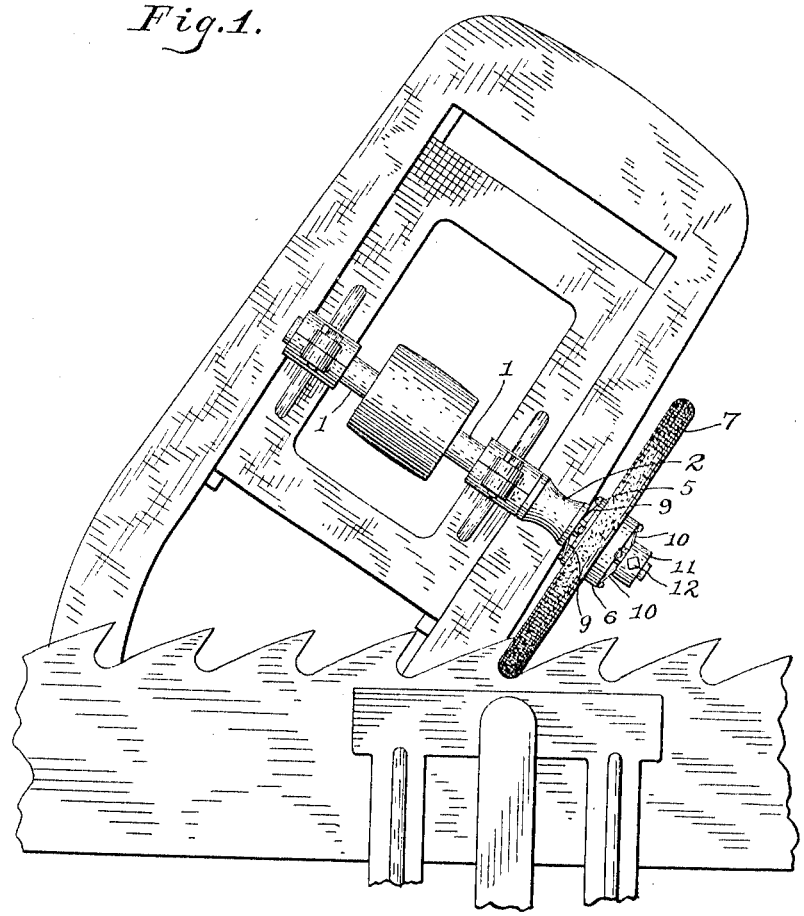

A. ELROD.
SAW GRINDING MACHINE.
APPLICATION FILED MAR. 8, 1913.

1,074,047.

Patented Sept. 23, 1913.

2 SHEETS—SHEET 1.

Witnesses
Chas. N. Leonard.
A. S. Rice.

Inventor
Abraham Elrod
by Bradford & Dooleu
Attorneys

A. ELROD.
SAW GRINDING MACHINE.
APPLICATION FILED MAR. 8, 1913.
1,074,047.
Patented Sept. 23, 1913.
2 SHEETS—SHEET 2.
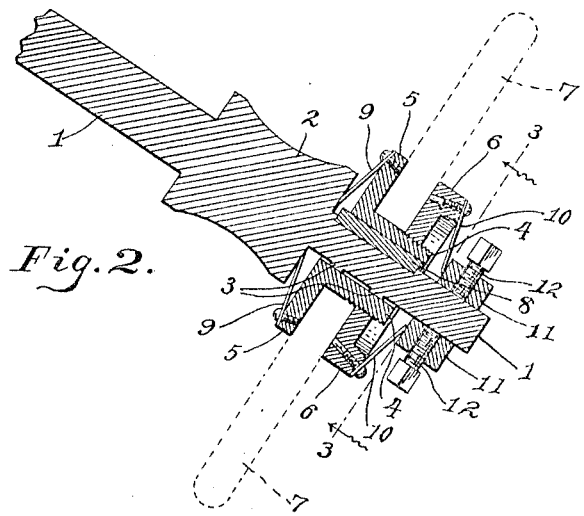
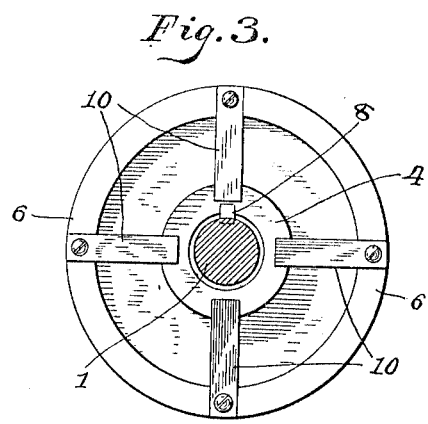
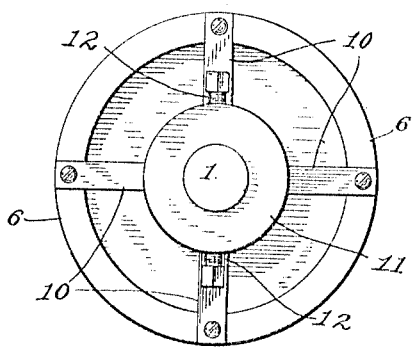
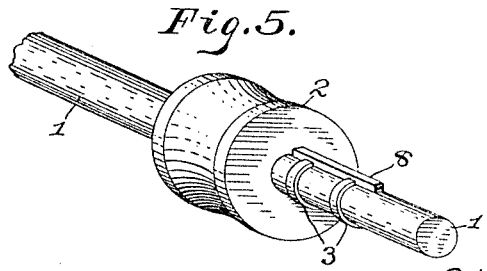
Witnesses
Chas N Leonard
A. S. Rice
Inventor
Abraham Elrod
by Bradford & Doolittle
Attorneys

UNITED STATES PATENT OFFICE.

ABRAHAM ELROD, OF SEYMOUR, INDIANA.

SAW-GRINDING MACHINE.

1,074,047.  Specification of Letters Patent.  Patented Sept. 23, 1913.

Application filed March 8, 1913.  Serial No. 753,004.

*To all whom it may concern:*

Be it known that I, ABRAHAM ELROD, a citizen of the United States, residing at Seymour, Jackson county, and State of Indiana, have invented and discovered certain new and useful Improvements in Saw-Grinding Machines, of which the following is a specification.

My invention relates to saw grinding machines and its object is to provide means to prevent "burning" of the saw teeth during the grinding operation, to obtain a uniform grinding pressure on the teeth and to facilitate the relative travel of the saw and the grinding wheel as the successive teeth of the saw are brought into contact with the wheel.

With these objects in view, my invention is embodied in preferable form in the device hereinafter described and illustrated in the accompanying drawings.

In these drawings, Figure 1, is a detail elevation of a part of a grinding machine showing the grinding wheel in engagement with a saw tooth; Fig. 2, a central vertical section; Fig. 3, a cross section on line 3—3 of Fig. 2; Fig. 4 an end view, and Fig. 5, a perspective view.

Referring to the drawings, 1 indicates a shaft or arbor adapted to be suitably mounted in a saw grinding machine of usual construction and adapted to be rotatably driven. A collar 2 is fixed on the arbor. Fixed on or formed integrally with the arbor 1 are bearing rings 3, spaced apart. Mounted upon these rings is a hub 4, having fixed thereto the disk 5 and being threaded on its outer surface adjacent its outer end to receive an interiorly threaded disk 6, which is adjustable by means of the screw threads. A grinding wheel 7 of emery or other suitable material is clamped between the two disks 5 and 6. The hub 4 is held against rotation independently of the arbor 1, by means of a longitudinal key 8 but said hub is permitted a movement longitudinally of the arbor on the bearing rings 3. These rings 3 serve to provide a bearing surface of small area for the hub whereby the friction due to the longitudinally sliding movement of the hub is lessened.

Extending radially and also outwardly at an angle from the outer face of the disk 5 are separated flat spring arms 9, the free ends of which are adapted to bear against the outer face of the fixed collar 2. Extending angularly and radially from the outer face of the disk 6 are separated flat springs 10. These springs, like the springs 9, in arrangement, form a truncated cone. The springs 9 and springs 10 are made of comparatively light and thin metal and the force of the outer springs 10 is exerted against the grinding wheel with a force sufficient to sustain yieldingly the weight of the wheel and the disks and their hub. The arbor is mounted at an inclination between the horizontal and vertical so that the tendency of the grinding wheel is to slide downwardly toward the outer end thereof. If desired, the inner set of springs 9 may be dispensed with, the tendency of the wheel to move downwardly due to gravity being sufficient to maintain the wheel yieldingly in its normal position on the shaft, and to cause it to bear with sufficient pressure against the saw teeth.

Adjustably fixed on the arbor 1, near the outer end thereof is a collar 11 adapted to be held in position on the arbor by means of set screws 12 which bear against the arbor. The springs 10 are adapted to bear against the inner face of this collar and by adjusting the collar on the shaft in or out, the pressure of the springs may be regulated.

In Fig. 1 the grinding wheel is shown in position for grinding a tooth. As the shaft is driven, thus turning the grinding wheel, the latter will bear against the front edge of the tooth. As the saw is advanced the wheel will be lifted up so as to follow the contour of the tooth and bear on the back edge thereof.

With the ordinary construction of grinding machine the bearing pressure of the wheel against the tooth is fixed and consequently should there be a slight inequality in the teeth so that one projects toward the wheel to a greater degree than the others, or should there be any variation in the relative positions of the teeth and the wheel due to any irregularity in the saw or in the operation of the saw advancing mechanism then also the wheel will be brought to bear against the teeth with a greater force than is necessary or desirable. The result of too great a pressure of the wheel against the teeth is what is termed "burning" of the tooth, that is such a hardening of the metal as will render the tooth brittle and liable to be easily broken and incapable of being swaged without danger of breaking the same. If the tooth is not advanced sufficiently far, the wheel, in the ordinary construction, will not be carried against the tooth with the proper pressure. With my invention as above described it will be seen that the grinding wheel is adapted to move automatically under a yielding pressure to and from the edge of the teeth in order to yield to obstructions and inequalities while at the same time the wheel is held against the teeth with sufficient force to insure a uniform pressure thereon. In my invention the emery wheel and its supporting disks and hub are alone movable longitudinally and the arbor remains stationary relative to such longitudinal movement, whereby the objections due to the resistance offered to the movement of the wheel by the weight of the arbor and the tension of the belt on the pulley are obviated.

The separate flat springs projecting radially and angularly from the face of the emery wheel clamping disk have been found to provide yielding pressure means very satisfactory in operation and to avoid binding or friction of such means and yet to impart sufficient pressure to the disk to insure its return without the necessity of employing springs of great strength. This result is due to the fact that the springs have no bearing against the arbor, that they are disposed circularly at equally distant points around the disk and that their outer ends are secured to the disk at the perimeter of the latter.

Having thus described my invention what I claim is:

1. In a saw grinding machine, in combination with a grinding wheel, a rotating arbor, a hub carrying said wheel and mounted on said arbor and movable longitudinally on the arbor under the pressure of the saw tooth, substantially as described.

2. In a saw grinding machine, in combination with a grinding wheel, a rotatable downwardly inclined arbor, means to drive said arbor, a hub carried at the lower end of the arbor, and in which said wheel is fixed, said hub being mounted to have free movement longitudinally of said arbor, and spring means bearing against the hub on the lower side thereof, substantially as described.

3. In a saw grinding machine, in combination with a rotatable arbor, a grinding wheel mounted to rotate with said arbor and automatically movable longitudinally thereon and operable to exert a yielding pressure against the saw tooth, substantially as described.

4. In a saw grinding machine in combination with a rotatable arbor, a grinding wheel mounted to rotate with said arbor and having a longitudinal movement thereon, and spring means on each side of said wheel to impart a yielding pressure thereto, substantially as described.

5. In a saw grinding machine in combination with a rotatable arbor, a grinding wheel mounted to rotate with but movable longitudinally on said arbor, a series of separated flat springs projecting radially and angularly from one face of said wheel and means fixed on the arbor against which said springs bear, substantially as described.

6. In a saw grinding machine, in combination with a rotatable arbor, a grinding wheel, disks between which said wheel is clamped, a hub on which said disks are mounted, means to fix said hub on said arbor against rotation while permitting automatic longitudinal movement thereof, a series of flat springs each secured at one end to the outer face of one of said disks near the perimeter thereof, and extending radially and angularly from the face of said disk and means fixed on the arbor against which the ends of the springs bear, substantially as described.

7. In a saw grinding machine, in combination with a rotatable arbor, a grinding wheel mounted for rotation with but having longitudinal movement independent of said arbor, and spring means exerting pressure against said wheel on opposite sides thereof, whereby the wheel is held against the saw tooth with a yielding pressure, substantially as described.

In witness whereof, I have hereunto set my hand and seal at Indianapolis, Indiana, this fifteenth day of February, A. D. nineteen hundred and thirteen.

ABRAHAM ELROD. [L. S.]

Witnesses:
   A. C. RICE,
   H. P. DOOLITTLE.

---

Copies of this patent may be obtained for five cents each, by addressing the "Commissioner of Patents, Washington, D. C."